United States Patent [19]

Artweger et al.

[11] 4,314,726
[45] Feb. 9, 1982

[54] CABIN STRUCTURE DISPLACEABLY MOUNTABLE ON A VEHICLE

[75] Inventors: Wolfgang Artweger, Windischgarsten; Otfried Reitz, Saalfelden, both of Austria

[73] Assignee: "Wohn-Art" Freizeitartikel Gesellschaft m.b.H., Windischgarsten, Austria

[21] Appl. No.: 111,947

[22] Filed: Jan. 14, 1980

[30] Foreign Application Priority Data

Jan. 25, 1979 [AT] Austria ................................ 578/79

[51] Int. Cl.³ .............................. B60P 1/64; B60P 3/34
[52] U.S. Cl. ....................................... 296/164; 254/45
[58] Field of Search ....................... 296/164, 165, 167; 248/352; 254/45; 212/267, 269, 189; 312/214

[56] References Cited

U.S. PATENT DOCUMENTS

| | | | |
|---|---|---|---|
| 3,532,236 | 10/1970 | Hostetler | 296/164 |
| 3,547,480 | 12/1970 | Ward | 296/164 |
| 3,622,193 | 11/1971 | Schmidt | 296/164 |
| 3,701,510 | 10/1972 | Logan | 296/164 |
| 3,817,545 | 6/1974 | Ward | 296/164 |
| 3,933,398 | 1/1976 | Haag | 312/214 |

Primary Examiner—Joseph F. Peters, Jr.
Assistant Examiner—John A. Carroll
Attorney, Agent, or Firm—Kurt Kelman

[57] ABSTRACT

A cabin having sections of different cross sectional areas is displaceably mountable on a van. The cabin is constituted by an integral wall of a synthetic resin material and an aluminum skin covers the wall in the transition zones between abutting cabin sections of different cross sectional areas. A support jack is mounted on the cabin section fitting over the driver's cab of the van and associated with each cabin side wall, the support jacks being transversely adjustably positionable into an operating position outwardly adjacent the vehicle side walls.

3 Claims, 3 Drawing Figures

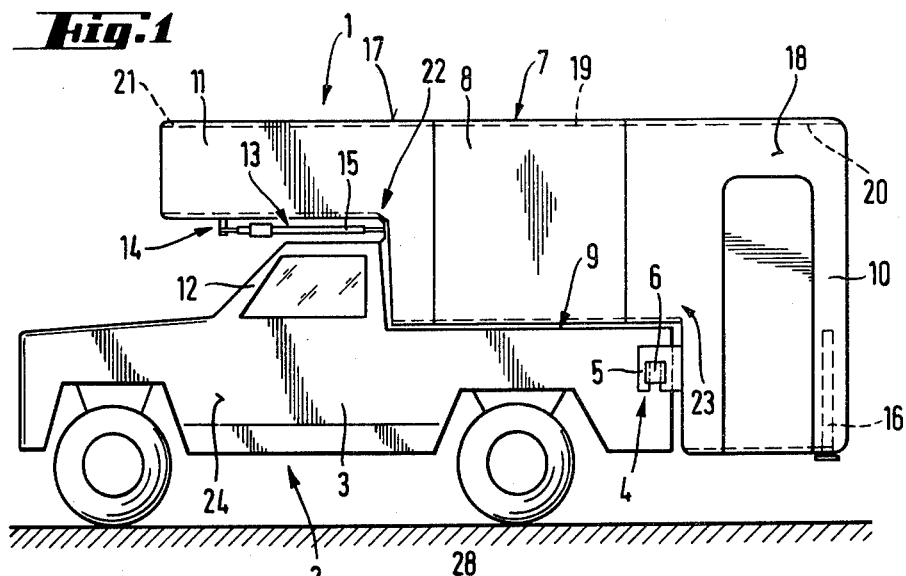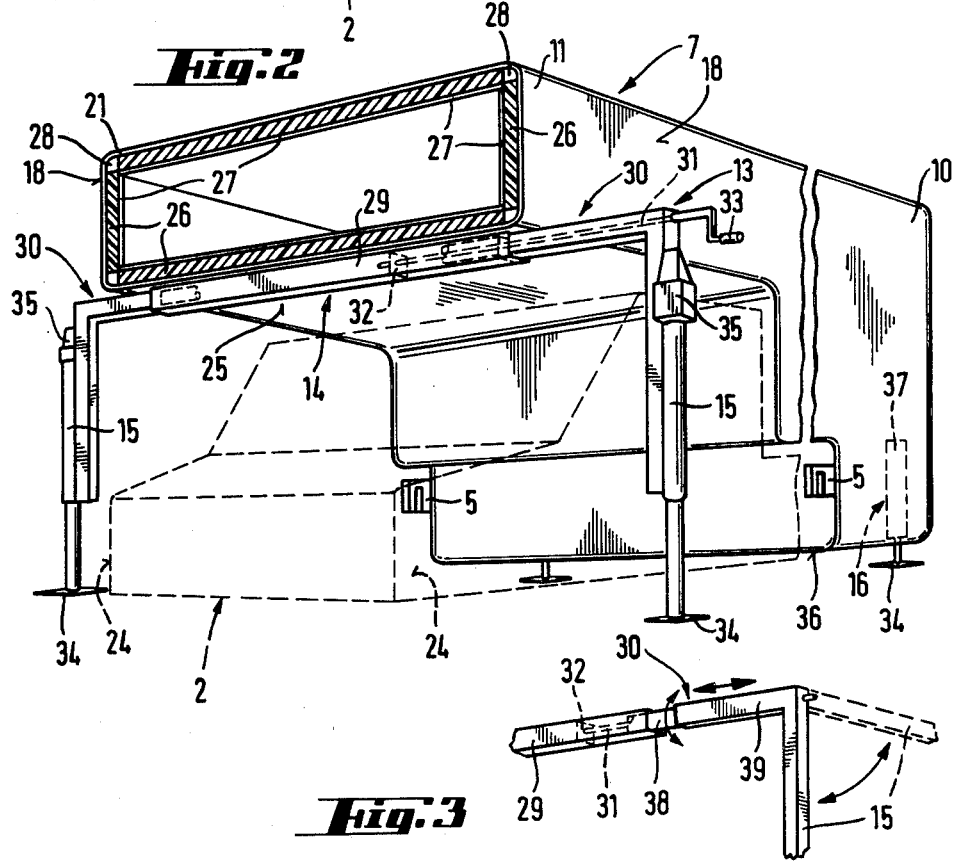

CABIN STRUCTURE DISPLACEABLY MOUNTABLE ON A VEHICLE

The present invention relates to a structure displaceably mounted on a vehicle, such as a van, having two side walls and a driver's cab.

Structures are known which comprise a cabin having sections of different cross sectional areas, with one of the cabin sections fitting over the driver's cab when the structure is mounted on the vehicle, and an adjustable lifting and support mechanism connected to the cabin for selectively mounting the cabin on the vehicle and removing it therefrom. Usually, these cabin structures have walls of metallic profiles to which are laminated inner and outer cover plates or skins defining cavities therebetween which are filled with insulating material. Rapidly changing temperatures and/or vibrations due to the vehicle movement cause the metallic wall profiles to subject the skins to excessive stresses and metal fatigue. These stresses and metal fatigue are particularly noticeable in the transition zone between the one cabin section fitting over the driver's cab and the abutting cabin section which constitutes the main chamber of the cabin, causing cracks in this zone. The walls of the main cabin chamber include a floor which rests on the bed of the van when the cabin structure is mounted thereon and, in the conventional structures, the adjustable lifting and support mechanism includes four jacks mounted at the respective corners of the main cabin chamber floor. When the cabin structure is removed from the van and is supported on the four jacks, the wall of the main cabin chamber must support the load of the one cabin section projecting therefrom and this increases the danger of crack formation in the skins in the transition zone between the abutting cabin sections. In addition, the area over which the support jacks are distributed is sometimes so small that a stable support of the cabin structure on the jacks is not assured.

It is the primary object of this invention to provide a displaceably mountable cabin structure which is robust and substantially insensitive to extreme temperature changes as well as vibrations, and which may be mounted and dismounted with relative ease while maintaining stability.

The above and other objects are accomplished according to the invention in a structure of the first-indicated type with a cabin constituted by an integral wall of a synthetic sheet material, the integral synthetic material wall including two side walls and a cover plate, which preferably is an aluminum skin, mounted on the wall over the transition zones between abutting cabin sections of different cross sectional areas. The adjustable lifting and support mechanism comprises a support jack mounted on the one cabin section fitting over the driver's cab when the structure is mounted on the vehicle and associated with each one of the cabin side walls. The cabin structure further comprises means for adjustably positioning the support jacks transversely to the vehicle into an operating position outwardly adjacent the side walls of the vehicle. Means is provided for detachably mounting and retaining the cabin structure on the vehicle.

The integral wall construction of the displaceable cabin structure assures a uniform distribution of all the forces to which the structure is subjected from the outside so that an excessive load on certain zones is substantially avoided, particularly an overload on, and resultant destruction of, the outer cover plate or skin of the wall. At the same time, the use of an integral wall of substantially the same thickness avoids zones of different resistance moments and or correspondingly different stresses. Since the synthetic resin material and the skins of the wall form an integral sandwich and the skins cover the transition zones, they will not be damaged. In addition, this has the unexpected result of enabling the lifting and support mechanism to be mounted on the one cabin area fitting over the driver's cab. This not only increases the stability of the cabin structure during mounting and dismounting but it also enables this mechanism to be stored during transport in the space normally available between the underside of the one cabin section and the roof of the driver's cab. The transverse adjustability of the support jacks enables them to be protected from damage during the transport by being stored in a rest position inwardly of the side walls of the vehicle.

The above and other objects, advantages and features of the present invention will become more apparent from the following detailed description of a now preferred embodiment thereof, taken in conjunction with the accompanying schematic drawing wherein FIG. 1 shows a side elevational view of a van having a cabin structure displaceably mounted thereon, FIG. 2 is a perspective view of the dismounted cabin structure, the forward cabin area being shown in transverse cross section and the forward portion of a van being indicated in phantom lines, and FIG. 3 is a partial enlarged view of the adjustable mounting of a support jack.

Referring now to the drawing, there is shown structure 1 displaceably mounted on a vehicle which is illustrated as van 2 including frame 3 on whose bed structure 1 rests when mounted on the van, as illustrated in FIG. 1. Means 4 for detachably mounting and retaining structure 1 on van 2 includes abutments 6 affixed to side walls 24 of van frame 3 and cooperating slotted brackets 5 attached to structure 1, the abutments being received in the slots of the brackets to anchor structure 1 to van 2. The slotted brackets are so guided on the abutments as to assure full stability of structure 1 on van frame 3.

Structure 1 comprises cabin 7 having sections 11, 8 and 10 of different cross sectional areas, adjacent ones of the cabin sections abutting at transition zones 22 and 23. Cabin section 8, which rests with its floor 36 on loading platform or bed 9 of the van, constitutes the main cabin chamber, cabin section 11 projects forwardly therefrom and fits over driver's cab 12 of van 2 and cabin section 10 projects rearwardly from the main cabin chamber and overhangs the rear of the van. As shown, the van has two side walls 24 and cabin structure 1 is constituted by an integral synthetic resin material wall including two side walls 18. Structure 1 further comprises lifting and support mechanisms 13 and 16. Lifting and support mechanism 13 includes support jack 15 mounted on cabin section 11 and associated with each one of cabin side walls 18. Means 14 for adjustably positioning support jacks 15 transversely to vehicle 2 into an operating position outwardly adjacent side walls 24 of the vehicle is mounted on cabin section 11 above driver's cab 12. Support mechanism 16 includes support jacks mounted at the respective rear corners of cabin section 10. Each support jack has a foot plate 34 for engagement with the ground.

As best shown in the section of FIG. 2, an integral wall of a synthetic resin material constitutes all three cabin sections and comprises cover plate 19, 20, 21, preferably an aluminum skin, mounted on the wall over transition zones 22 and 23. The cover plate extends at least over roof 17 and side walls 18 of cabin 7 and covers the transition zones. This forms a very strong wall structure for a cabin with sections of different cross sectional areas and enables the cabin structure to sustain heavy loads since the loads at the transition zones are distributed by cover plate 19, 20, 21 over the entire wall so that material fatigue is avoided in these vulnerable zones. Lifting and support mechanisms 13 and 16 are so arranged that the support jacks are held in their rest position between the planes of the vehicle and cabin side walls so as to be fully protected.

FIG. 2 illustrates cabin structure 1 dismounted from van 2 portions of which are shown in phantom lines to provide an understanding of the positional interrelationship of the cabin structure and van. The integral wall constituting cabin 7 comprises roof 17, two side walls 18 and floor 25. This integral wall is constituted by load-bearing core 26 of synthetic resin, preferably a rigid plastic foam, sandwiched between outer aluminum skin 21, 19, 20 and inner skin 27 which may be a plate of wood or like material. The load-bearing core and the inner and outer skins are pressed together under high pressure to form a laminate. In this manner, the entire sandwich structure forms a very strong wall capable of bearing heavy loads after it is shaped into the illustrated cross section, synthetic resin foam inserts 28 being formed in situ at the corners between synthetic resin core portions 26 to produce an integral structural part. A very useful integral housing body and a method of manufacturing it are disclosed and claimed in copending application Ser. No. 45,957, filed June 11, 1979, in which one of the joint inventors is also a joint inventor. Cover plates 19, 20, 21 over transition zones 22 and 23 assure a full load-bearing capacity of the integral wall in these vulnerable areas, too. As has been more fully disclosed in the copending application, core portions 26 are bonded into an integral whole by foam inserts 28 which are produced in the corner spaces between the core portions.

Means 14 for adjustably positioning support jacks 15 transversely to vehicle 2 into the operating position shown in FIG. 2 outwardly adjacent side walls 24 of the vehicle comprises transverse guide means 29 arranged on cabin section 11 and means 30 for mounting the support jacks in guide means 29 for pivoting substantially parallel to the side walls. This arrangement makes it possible to pivot the support jacks into a rest position above the traveling surface of the vehicle, as shown in FIG. 1. The illustrated transverse guide means comprises tubular carrier element 29 mounted fixedly on floor 25 of cabin section 11 and respective tubular guide elements 30, 30 telescopingly guided in tubular carrier element 29, each of the guide elements carrying a respective support jack 15 for movement therewith. The tubular elements extend substantially perpendicularly to the side walls. This simple telescopic guide reduces the required width of the vehicle during transport of cabin structure 1.

Tubular carrier element 29 is of polygonal cross section, a quadratic section being shown by way of example, tubular guide elements 30 have a first part 38 telescopingly guided in tubular carrier element 29 and of circular cross section, and a second part 39 carrying support jacks 15 and of polygonal cross section, polygonal tubular carrier element 29 being arranged to envelop first and second parts 38 and 39 of guide elements 30. This particular arrangement of the transverse guide means enables it to be used also to fix the support jacks in their respective rest and operational positions.

In the illustrated embodiment, the tubular elements are arranged to hold support jacks 15 against pivoting in a rest position wherein the jacks extend substantially horizontally and in the operating position wherein the jacks extend substantially vertically. The side walls 24 of vehicle 2 extend in respective planes inwardly displaced from the planes defined by cabin side walls 18, and tubular elements 29, 30 are arranged to hold the support jacks in the rest position in the spaces between the vehicle and cabin side walls.

As illustrated in FIG. 2, threaded spindle 31 is rotatably mounted in each tubular guide element 30 and has a free threaded end engaging nut 32 fixedly mounted in tubular carrier element 30. Crank 33 is attached to the opposite end of the threaded spindle and, upon rotation of spindle 31 by crank 33 into one or the other direction, guide element 30 and support jack 15 carried thereby are transversely adjusted. Support shoes 34 of jacks 15 are vertically movable into respective supporting and retracted positions by suitable motors 35. Electric motors operating suitable threaded spindle-and-nut drives are useful for this purpose.

When it is desired to mount cabin structure 1 on van 2, jacks 15 of lifting and support mechanism 13 and jacks 37 of lifting and support mechanism 16 are actuated to lift the cabin structure sufficiently to enable van 2 to be driven under the raised cabin structure until abutments 6 and slotted brackets 5 of means 4 for detachably mounting and retaining the cabin structure on the vehicle are in vertical alignment. Support jacks 15 are in their operating position outwardly adjacent side walls 24 of van 2 during this mounting operation. The jacks are now retracted until floor 36 of cabin structure 1 comes to rest on bed 9 of the van, the slots of brackets 5 engaging abutments 6 during the lowering of the cabin structure to lock the structure automatically on the van. The jacks are then further retracted and pivoted into their rest position indicated in FIG. 1.

As shown in FIG. 3, guide element 30 has a first part 38 of circular cross section and a second part 39 of polygonal cross section. When the support jack is in the operating position illustrated in FIG. 2, i.e. when cabin structure 1 is dismounted from the vehicle and supported by its lifting and support mechanisms, polygonal guide element part 39 telescopingly extends into tubular carrier element 29, the guide element part being of the same cross section as the carrier element and being glidable therein with little play so that the guide element and its support jack may be transversely adjusted relative to the carrier element. After cabin structure 1 has been mounted on van 2 and jack shoes 34 have been retracted, cranks 33 are turned to move guide elements 30 out of carrier element 29 until only first guide element part 38 of circular cross section remains within the tubular carrier element. The diameter of guide element part 38 is so selected that the walls of polygonal tubular carrier element 29 envelop circular guide element part 38. This enables support jack 15 to be pivoted in relation to carrier element 29 in a plane substantially parallel to that of side wall 18 of cabin 7, as shown in broken lines in FIG. 3. As soon as jack 15 extends parallel to floor 25 of cabin section 11 (see FIG. 1), crank 33 is again turned to move guide element 30 inwardly into carrier element 29 until polygonal guide element part 39 again engages polygonal carrier element 29, thus locking the support jack in the rest position. In this manner, the support jacks are held against pivoting in their rest and operating positions while being pivotal between these positions. Side walls 24 of vehicle 2 extend substantially in the same planes as cabin side walls 18 so as to minimize the width of the combined van and the support jacks are so guided that they will be held in the rest position between the planes of the vehicle and cabin side walls, i.e. they will not laterally project therefrom, while being positionable in laterally extended operating position without additional means.

If desired, lifting and support mechanism 16 mounted on rear cabin section 10 may be constructed like mechanism 13 but since this cabin section overhangs bed 9 of van 2, simple support jacks 37 may be mounted at the rear corners of cabin 7. Furthermore, various means 14 for adjustably positioning support jacks 15 transversely to vehicle 2 into an operating position outwardly adjacent side walls 24 of the vehicle may be used. Instead of using threaded spindle 31 for the transverse adjusting movement, any suitable mechanical, hydraulic or hydro-pneumatic drive may be used for this purpose. It will also be obvious to those skilled in the art that any suitable type of support jacks may be used, including hydraulically or pneumatically actuated jacks. Also, while synthetic resin foams have been described as load-bearing cores for the integral cabin wall, load-bearing profiled frame structures of various types may be used as long as the cover plates extend over the transition zones between abutting cabin sections of different cross sectional areas. Sheet aluminum is a preferred material for the cover plates but various other sheet materials may be useful. Means 14 for detachably mounting and retaining the cabin structure on the vehicle also may take various forms, including many types of couplings, including remote-controlled couplings. To reduce the operating width of the structure and eliminate all laterally projecting parts, cranks 33 may be detachably mounted on threaded spindles 31.

What is claimed is:

1. A van comprising a vehicle having two side walls and a driver's cab; a cabin displaceably mountable on the vehicle, the cabin having sections of different cross sectional areas, adjacent ones of the cabin sections of different cross sectional areas abutting at transition zones and one of the cabin sections fitting over the driver's cab when the cabin is mounted on the vehicle, the cabin having an integral wall of synthetic resin material with an aluminum skin over the transition zones and the cabin wall including a roof portion and two side wall portions; two support jacks mounted on the one cabin section and associated with the two side wall portions; means for adjustably positioning the support jacks transversely to the vehicle into an operating position outwardly adjacent the side walls of the vehicle, the jack positioning means comprising a transverse guide means arranged on the one cabin section, the guide means comprising a tubular carrier element of polygonal cross section mounted on the one cabin section and a respective tubular guide element telescopingly guide in the tubular carrier element, the guide elements having a first part telescopingly guided in the tubular carrier element and of circular cross section, and a second part carrying the support jacks and of polygonal cross section, the polygonal tubular carrier element being arranged to envelop the first and second parts of the guide elements and the tubular elements extending substantially perpendicularly to the side walls; and means for adjustably mounting and retaining the cabin on the vehicle.

2. The van of claim 1, wherein the tubular elements are arranged to hold the support jacks against pivoting in a rest position wherein the jacks extend substantially horizontally and in the operating position wherein the jacks extend substantially vertically.

3. The van of claim 2, wherein the side walls of the vehicle extend substantially in the same planes as the cabin side walls, and the tubular elements are arranged to hold the support jacks in the rest position between the planes of the vehicle and cabin side walls.

* * * * *